UNITED STATES PATENT OFFICE.

GERALD H. MAINS, OF DETROIT, MICHIGAN.

METHOD FOR THE REMOVAL OF VARNISH, LACQUER, ENAMEL, PAINT, AND SIMILAR COATINGS FROM ANY OBJECTS OR MATERIALS.

1,381,485.  Specification of Letters Patent.  Patented June 14, 1921.

No Drawing.   Application filed December 6, 1920. Serial No. 428,666.

(FILED UNDER THE ACT OF MARCH 3, 1883, 22 STAT. L., 625.)

*To all whom it may concern:*

Be it known that I, GERALD H. MAINS, a citizen of the United States of America, and an employee of the Department of Agriculture, residing in the city of Detroit, county of Wayne, State of Michigan, (whose post-office address is Department of Agriculture, Washington, D. C.,) have invented a new and useful Method for the Removal of Varnish, Lacquer, Enamel, Paint, and Similar Coatings from any Objects or Materials.

This application is made under the act of March 3, 1883, chapter 143 (22 Stat., 625), and the invention herein described and claimed is hereby dedicated to the free use of the Government and the public without payment to me of any royalty thereon.

I have found that furfural, a cheap and slowly volatile solvent, alone or mixed with other solvents, when applied to surfaces covered with varnish, lacquer, paint, or enamel, or other coating, exerts a solvent action which permits the convenient, rapid and efficacious removal of such coating material.

I shall illustrate my invention by describing the solvents I have used and the manner in which I have employed them without limiting myself to the special concentrations or particular nature of the ingredients other than furfural.

One preparation that I use consists of furfural, 2-furaldehyde (also known as fural, furol, furfurol, or pyromucic aldehyde), a liquid slightly heavier than water, and boiling at 155° C. to 168° C. under ordinary atmospheric pressure, the boiling point depending upon the purity of the furfural. This liquid furfural can be readily and cheaply prepared from corn cobs, wood waste, or other pentosan containing material by the well known process of digesting with acid, distilling off a mixture of furfural and water, and concentrating the furfural in the distillate. I apply the furfural to the surface from which I wish to remove the varnish. A rapid solvent action takes place, and the varnish can be removed almost immediately by the simple wiping with a cloth. Lacquer and enamel are removed in the same way.

To remove paint from surfaces the furfural is applied in a fairly thick layer and allowed to remain for a few minutes whereupon the paint becomes softened and may be readily removed by a knife, scraper, or stiff brush.

To remove varnish, lacquer, enamel, or paint, from cloth or paper I dip a piece of cloth in the furfural and rub the varnished, lacquered, enameled, or painted portion with it. Any furfural left on the cloth or paper being cleaned disappears by evaporation.

I use this preparation for the cleaning of varnish and paint brushes by allowing them to stand a few minutes in a vessel containing furfural.

Other preparations that I have used to remove varnish and paint are made by mixing furfural with other solvents, water, alcohol, benzene, acetone, benzin, gasolene. These preparations are applied in the same manner as furfural alone and rapidly and effectively remove the varnish, lacquer, enamel or paint. I do not limit myself to preparations containing furfural and the above named solvents, as many other inorganic and organic solvents when mixed with substantial proportions of furfural will remove varnish, lacquer, enamel, and paint. However, I prefer to use furfural alone, the material in the crude state serving very well for this purpose.

Having thus described my invention, I claim—

A method of removing varnish from varnished surfaces, consisting in applying to the varnish a coating of furfural and subsequently removing the loosened varnish.

In testimony whereof, I affix my signature in the presence of two subscribing witnesses.

GERALD H. MAINS.

Witnesses:
MAX PHILLIPS,
MARSHALL J. GOSS.